United States Patent

Rush

[15] 3,636,682
[45] Jan. 25, 1972

[54] CYCLONE SEPARATOR

[72] Inventor: John B. Rush, Bartlesville, Okla.
[73] Assignee: Phillips Petroleum Company
[22] Filed: Mar. 8, 1968
[21] Appl. No.: 711,808

[52] U.S. Cl. ............................................................55/459
[51] Int. Cl. ...........................................................B04c 5/04
[58] Field of Search....................55/459, 460, 349, 235-238;
210/512; 209/144, 211

[56] References Cited

UNITED STATES PATENTS

| | | | |
|---|---|---|---|
| 912,686 | 2/1909 | Keeney | 55/459 |
| 1,265,763 | 5/1918 | Fender | 55/459 |
| 2,102,525 | 12/1937 | Freeman | 209/144 |
| 2,534,702 | 12/1950 | Driessen | 55/460 |
| 2,568,032 | 9/1951 | Stephanoff | 55/459 |
| 2,840,240 | 6/1958 | Snyder | 55/459 |
| 2,890,764 | 6/1959 | Arnold | 209/144 |
| 3,129,173 | 4/1964 | Schulze | 209/211 |
| 3,212,240 | 10/1965 | Streete | 55/457 |
| 3,273,320 | 9/1966 | Delaune et al. | 55/459 |
| 3,348,683 | 10/1967 | Wikdahl | 55/459 |

Primary Examiner—Frank W. Lutter
Assistant Examiner—Bernard Nozick
Attorney—Young and Quigg

[57] ABSTRACT

A cyclone separator suitable for separating particulate matter from a gas stream in which various sections of the multisectional gas outlet tube are dimensionally and positionally related to the inlet horn and its area in such relationships as to result in the high-efficiency separator.

1 Claims, 2 Drawing Figures

PATENTED JAN 25 1972

3,636,682

INVENTOR.
J. B. RUSH

BY

*Young & Quigg*
ATTORNEYS

CYCLONE SEPARATOR

This invention relates to particulate matter collecting apparatus. More specifically, this invention relates to apparatus of the cyclone type used in separating particulate matter from gas streams.

Particulate matter collecting apparatus, otherwise known as dust-collection equipment, is widely used for the purpose of separating dust from a gas stream. Such dust particles are frequently entrained in such gas streams due to the velocity of the gas.

The most widely used type of dust-collecting equipment is the cyclone separator in which dust-laden gas enters a chamber tangentially, at one or more points, and leaves through a central opening. The dust particles, by virtue of their inertia, tend to move outward toward the outside separator wall from which they gravitate and pass out through a removal pipe. The gas stream, from which the dust particles have been separated, leaves in an upward direction.

Cyclones have been employed to remove solids from gases under operating temperatures as high as 1,000° C. and pressures as high as 500 atmospheres. Cyclones are desirable for removing solids from gases when particles over 5 microns in diameter are involved. Unless very small cyclones are used, the efficiency will be low if much of the suspended material is finer than 5 microns inasmuch as the centrifugal separating force, or acceleration, to which the particulate matter is subjected may range from 5 times gravity in very large diameter cyclones, to 2,500 times gravity in small cyclones. Efficiencies as high as 98 percent have been realized.

To a large extent, the design of cyclone separators is based upon empirical data, due to the fact that the forces operating within a cyclone separator are generally not susceptible to accurate analysis. For example, in a cyclone, the gas path involves a double vortex with the gas spiraling downward at the outside and upward at the inside. Upon entering the cyclone, the gas velocity undergoes a redistribution so that the tangential component of velocity increases with decreasing radius. The spiral velocity in a cyclone may reach a value several times that of the inlet gas velocity. At the wall, the gas velocity approaches zero, whereas it reaches a maximum at short distances inward from the wall. Superimposed on the double spiral, there may be double eddys wherein velocities are small as compared to spiral velocities.

The design of cyclone separators is further complicated by pressure drop or friction considerations. Generally, it is desirable to limit pressure drop for improved efficiency of the separator.

Such factors have been taken into account in the design of the dust-collecting apparatus, or cyclone separator, which is the subject of this invention. This dust-collecting apparatus, comprises a casing, an inlet into the casing, a downwardly discharging conduit from the casing to discharge the particulate matter, and an upwardly discharging conduit from the casing to discharge the gases with some residual solids, from the casing. This gas discharge conduit is composed of a plurality of sections including an apertured entrance section, an upper section having a cross-sectional area greater than the cross-sectional areas of the apertured entrance section, and an intermediate section interconnecting the entrances section with the upper section. The improvement constituting this invention comprises positioning the aperture of the entrance section no higher than the horizontal centerline of the inlet into the casing, the apertured entrance section having a height from about 0.3 to about 1.0 times the height of the inlet into the casing, the upper section of the discharge conduit having a cross-sectional area at least equal to the area of the casing inlet, there interconnection between the intermediate section and the upper section of the discharge conduit being positioned above the inlet into the casing, the interconnection between the intermediate section and the apertured entrance section being positioned at least at the elevation of the horizontal centerline of the inlet into the casing, the aperture of the entrance section being of such cross-sectional areas as to impart to the gas a velocity no less than about 100 feet per second.

Accordingly it is the object of this invention to provide an improved cyclone separator.

It is another object of this invention to provide a cyclone separator of greater efficiency but at allowable pressure drops.

The inlet to the cyclone casing normally enters the casing tangentially, forming a horn, frequently circular, but more often rectangular in configuration, which decreases in area as its distance from its entrance increases. The entry into the horn is preferably vertically positioned if rectangular, that is, the longer axis lies in a vertical plane, the height of the entry being greater than its width. Sizing of the inlet and horn is largely a matter of satisfying the requirements of creating the necessary centrifugal effect without the creation of undesirably large amounts of pressure drop and erosion. Preferred casing inlet velocities are from about 50 to about 85 feet per second, based on the actual gas volume entering. The horizontal centerline of the horn inlet preferably lies in a plane which intersects the gas discharge conduit some where near its lower extremity.

The casing of the cyclone separator generally is of closed circular configuration its walls being essentially continuous at the top and bottom. Preferably, it has an upper section of circular configuration mounted on a lower section of inverted conical configuration which leads to the lower discharge conduit. This lower discharge conduit is normally circular in configuration and provides passage for the disentrained solid matter from the separator. The principal requirement of the lower discharge conduit is that it be large enough to provide adequate flow area.

The gas discharge conduit from the casing provides the exit for the gas from the separator. The gas may still contain particles of solid matter. This discharge conduit is composed of three sections in continuous, open communication with each other and from the separator.

The lowest section of the gas discharge conduit is the entrance section. This entrance section is apertured, that is, it contains at its lowest extremity, a horizontally disposed entry into the discharge conduit.

The apertured entrance section is positioned below the horizontal centerline of the inlet to the casing, and has a length in relation to the height of the inlet to the casing of between about 0.30 and about 1.0. The aperture of the entrance section is preferably of such cross-sectional area as to impart to the fluid flowing therethrough, that is, the gas, a velocity from about 100 feet per second to about 250 feet per second.

The upper section makes up the major portion of the discharge conduit. This upper section has a cross-sectional area greater than that of the entrance section and, furthermore, has a cross-sectional area at least equal to the area of the inlet into the casing.

Between the entrance section and the upper section, there exists an intermediate section which interconnects the entrance section with the upper section. Interconnections between the intermediate section and each of the other sections will generally be welded. Because this intermediate section connects an entrance section of comparatively small area with an upper section of comparatively large area, it acts as a transition section and is advantageously of conical configuration. The weld between the intermediate section and the apertured entrance section is positioned at least at the elevation of the horizontal centerline of the inlet into the casing. The interconnection between the intermediate section and the upper section is positioned above the upper edge of the inlet into the casing.

An understanding of this invention will be facilitated by reference to the attached drawings of an embodiment of this invention as applied to a cyclone separator used for the separation of catalyst from a gas stream produced by a fluid catalytic cracking unit.

Figure 1:
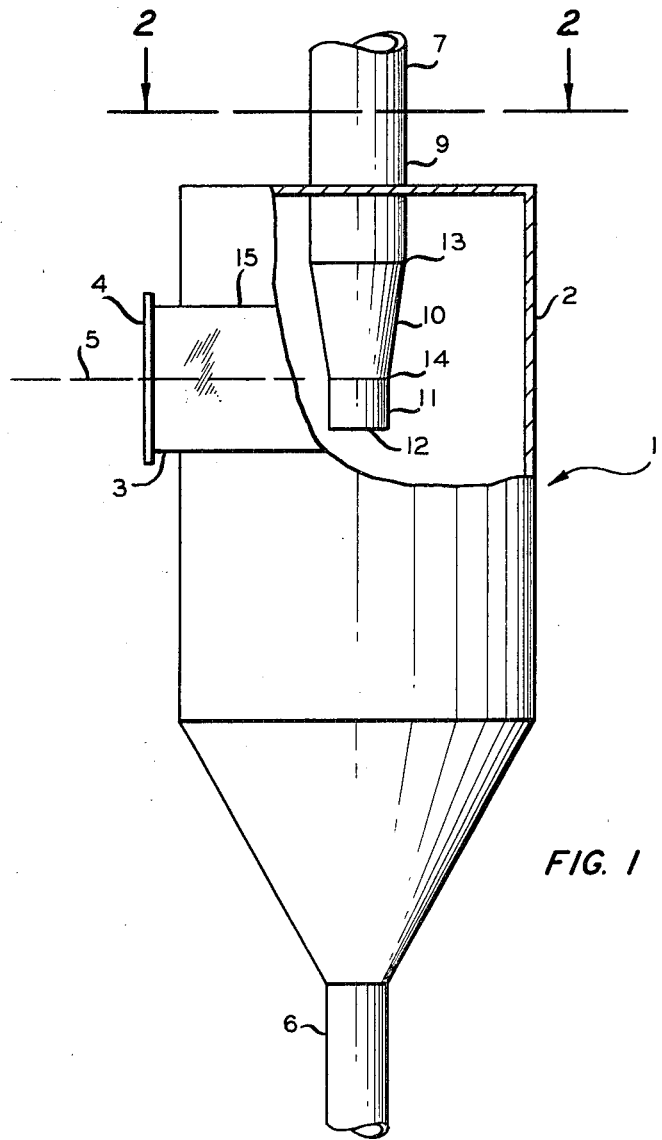
FIG. 1 is an elevation view of the apparatus of this invention.
Figure 2:
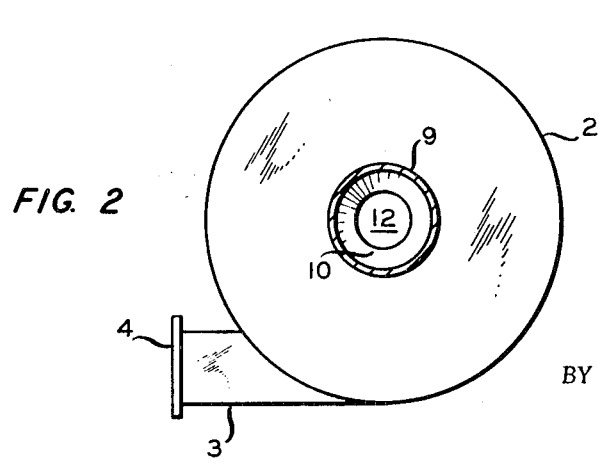
FIG. 2 is a plan view of the apparatus of this invention taken through section 2—2 of FIG. 1.

Referring now to FIG. 1, cyclone 1 has exterior casing 2 which is vertically positioned. Opening into casing 2 is inlet horn 3, attached to which, is inlet 4. Imaginary line 5 indicates the centerline of the vertical dimension of inlet 4. Lower discharge conduit 6 extends vertically downward from the interior of casing 2. Discharge conduit 7 extends vertically upward out of casing 2.

Gas discharge conduit 7 consists of three sections: Upper section 9, intermediate section 10 and entrance section 11, the aperture into section 11 being designated as 12. The weld line between intermediate section 10 and upper section 9 is indicated by 13 and the weld line between entrance section 11 and intermediate section 10 is indicated by 14.

In accordance with this embodiment of this invention, aperture 12 into entrance section 11 is positioned below imaginary horizontal centerline 5 of inlet 4 into casing 2. Further, interconnection 14 between intermediate section 10 and entrance section 11 is positioned coinciding with imaginary centerline 5 of inlet 4 into casing 2. It is preferable that intersection 14 to be located no lower than centerline 5. Intersection 13 between intermediate section 10 and upper section 9 is located above 15, the upper edge of inlet 4. As previously stated, it is preferred that this interconnection between the intermediate section 10 and upper section 9 be no lower than the upper edge 15 of inlet 4.

The operation of this unit is comparatively simple. Gas enters inlet 4, into horn 3, impinging upon casing 2 wherein separation of gas and solids is effected. Within casing 2, the gas passes upward through aperture 12 into section 11, section 10, and section 9, successively, and out of the casing. The catalyst descends within casing 2 and passes out from casing 2 through outlet 6.

A further understanding of this invention will be facilitated by the following discussion of the design of the apparatus of this invention as applied to a cyclone separator used for the separation of catalyst from a gas stream produced by a fluid catalytic cracking unit.

Gas flow to the cyclone separator was 100,000 standard cubic feet per minute based upon 60° F. and 14.7 p.s.i.a. The actual conditions under which the gas entered the casing were 1,150° F. and 7 p.s.i.g. The actual volume of gas flowing into the casing was 3,500 cubic feet per second.

Thirteen cyclone separators, as described herein, were used in the separation. The quantity to each cyclone was, accordingly, 270 actual cubic feet per second.

The area of the inlet to each cyclone was 4.5 square feet, each inlet being rectangular and having a width of 1.5 feet and a height of 3 feet. The inlet velocity was 60 feet per second which was within the preferred range for imparting sufficient centrifugal effect to the gas but not so high as to cause erosion.

The entrance section of the gas outlet had an entrance diameter of 1.5 feet, or an area equivalent to 1.75 square feet. The entrance section was 1 foot in length. The resulting velocity through the entrance section was 155 feet per second.

The upper section of the gas outlet had a diameter of 2.5 feet, equivalent to an area of 4.9 square feet. The gas in this section had a velocity of 55 feet per second.

The intermediate section which was conical increased from a diameter of 1.5 feet to a diameter of 2.5 feet, entrance of the gas into this section being made at 155 feet per second, the gas exiting this section at 55 feet per second.

The intersection of the intermediate section and the entrance section was located 6 inches above the centerline of the inlet to the entrance horn. The entrance section had a length equivalent to one-half the vertical height of the inlet to the entrance horn. The intersection of the intermediate section and the upper section was located 6 inches above the uppermost edge of the inlet of the entrance horn.

The operation of this cyclone separator was particularly effective. Prior to its use, the rate of catalyst loss experienced through the gas outlet was 5 tons per day. With the use of a cyclone separator of the above design, this loss was decreased to less than 3 tons per day, a considerable lessening in catalyst makeup requirements and in pollution of the atmosphere.

The subject of this invention has been described in a simple embodiment. Variations can be made, including installing cones and baffles within the casing, and placing impingement type baffles prior to entrances to the various exits or entrances.

However, the invention is not to be considered as limited to the embodiment described nor are the possible variations considered as being outside the scope of the invention.

What is claimed is:

1. In a cyclone dust-collecting apparatus having a casing of circular cross section and a top wall, a casing inlet, a lower discharge conduit from the casing, an axial gas discharge conduit from the casing extending through the top wall comprising an apertured cylindrical entrance section, an upper cylindrical outlet section of flow area greater than that of the entrance section and an intermediate section communicating between said entrance section and said upper section, the improvement which comprises the aperture to said entrance section being positioned no higher than the horizontal centerline of the casing inlet and no lower than the casing inlet bottom wall, said upper section having a flow area at least equal to the flow area of said casing inlet, the interconnection between said upper section and said intermediate section being positioned above the casing inlet and below the top wall, said intermediate section being of frustoconical configuration and having a flow area intermediate of the flow areas of said upper section and said entrance section, the interconnection between said intermediate section and said entrance section being positioned substantially coincident with the horizontal centerline of said casing inlet, the aperture into said entrance section being of such flow area as to impart to the fluid flowing therethrough a velocity of from about 100 to about 250 feet per second, said gas discharge conduit discharging vertically from said casing.

* * * * *